United States Patent [19]

Storck

[11] Patent Number: 4,986,795

[45] Date of Patent: Jan. 22, 1991

[54] METHOD AND APPARATUS FOR GUIDANCE AND ACTUATION OF FLAT BELT DRIVE UNDER EXTERNAL LOAD

[75] Inventor: Karlheinz Storck, Muhltal, Fed. Rep. of Germany

[73] Assignee: Carl Schenck AG, Fed. Rep. of Germany

[21] Appl. No.: 531,256

[22] Filed: May 31, 1990

Related U.S. Application Data

[62] Division of Ser. No. 329,943, Mar. 29, 1989, Pat. No. 4,944,714.

[30] Foreign Application Priority Data

Apr. 22, 1988 [EP] European Pat. Off. ........ 88106487.7

[51] Int. Cl.$^5$ .............................................. F16H 57/04
[52] U.S. Cl. .......................................... 474/91; 474/188
[58] Field of Search ................... 474/91, 93, 188, 189, 474/174–176; 184/15.1

[56] References Cited

U.S. PATENT DOCUMENTS

| 593,366 | 11/1897 | Tillison | 474/189 |
| 4,284,409 | 8/1981 | Van Teslaar | 474/188 X |
| 4,509,933 | 4/1985 | Miranti, Jr. et al. | 474/188 X |
| 4,545,778 | 10/1985 | Koivula | 474/188 X |
| 4,752,279 | 6/1988 | Ogino | 474/91 |

Primary Examiner—Thuy M. Bui
Attorney, Agent, or Firm—Connolly and Hutz

[57] ABSTRACT

A flat belt drive is trained around spaced apart drive and idler rollers. The belt has an outer load bearing surface and an inner surface wetted to reduce friction on the inner surface where the load is applied. Drainage channels or grooves in the exterior surface of the drive and idler rollers function to remove liquid from between the rollers and the inner surface of the belt in order to maintain a high frictional coefficient therebetween. Alternatively, drainage openings are provided in the roller to convey the liquid away from the roller surface to the hollow interior thereof.

7 Claims, 3 Drawing Sheets

METHOD AND APPARATUS FOR GUIDANCE AND ACTUATION OF FLAT BELT DRIVE UNDER EXTERNAL LOAD

CROSS-REFERENCE TO RELATED APPLICATION

The present application is a division of application Ser. No. 329,943, filed Mar. 29, 1989 now Pat. No. 4,944,714.

BACKGROUND OF THE INVENTION

The present invention is directed to a method and apparatus for guidance and actuation of a flat belt drive having an outer load carrying side and an inner driven side which is wetted and which is trained around a drive and idler rollers.

Such belt drives are used in tire test machines (DE-OS 31 05 163) and particularly in vehicle test stands or chassis dynamometers (DE-OS 30 40 355) designed as so-called flat track test stands.

Unlike chassis dynamometers having rollers closely spaced to one another, in the case of flat track test stands, the vehicles are not supported by the rollers of the dynamometer. Instead, the vehicle or component to be investigated is supported by its wheels which rest upon a drive belt wrapped around two rollers or sheaves. In order to assure that accurate measured values are obtained it is important to make the belt drive quite stiff in the area of tire contact. As disclosed in DE-OS 31 05 103, this is accomplished at the support arrangement for the drive belts of tire test machines, by means of a support arrangement located between the rollers about which the flat belt is trained. This arrangement is covered by a plate with holes out of which liquid emerges perpendicular to the transport direction of the belt drive. The liquid enters the gap between the flexible steel, belt and the plate. With this mechanism friction between the steel belt and the necessary support arrangement is reduced to a minimum, and additionally a stiff guidance is provided for the drive belt in the area of the tire contact of the wheel to be investigated.

Liquid between the idler and drive rollers and the steel band with the load thereon causes reduction of friction and impairment of guidance. In order to prevent the formation of a liquid layer at the steel band which would act as a layer between the band and the idler and the drive rollers, a wiper of synthetic material is arranged at the end of the support arrangement as viewed in the transport direction.

In order not to unreasonably shorten the life of the steel belts which are subject to constant bending around the drive and idler means it is necessary to employ large rollers for such belt drives. Further, belt drives with such rollers have the disadvantage of requiring considerable space. Their large mass is especially disadvantageous if, by means of such an arrangement, movements in the vertical direction are to be transmitted to the vehicle wheels.

In above mentioned DE-OS 30 40 355 a test stand is disclosed for the determination of the fatigue strength of motor cars or chassis components by means of a simulation of service loads. The wheels of the motor car or chassis components to be tested are supported by a roller element that is capable of either driving or braking. A separate roller element is coordinated to each wheel, and the positions of those roller elements are adjustable and independent of the position of the other roller elements. The roller elements in this case consist of linked belts that revolve over a load carrying plate between toothed deflection drives. An arrangement of this kind is not suitable for investigation at high speed where considerable forces are exerted because of the high wear rate of the metal parts used.

SUMMARY OF THE INVENTION

One object of the present invention is to achieve a frictional coefficient between the inner drive side of an endless flat belt and a drive roller which is practically equal to dry conditions even when the drive side of such endless belt is wetted. Through proper drainage of the drive and idler rollers, the formation of a liquid film is avoided, for example, a liquid film between the outer circumference of a drive roller or an idler roller and the inner drive side of a belt. Drainage occurs because the flat belt is pretensioned by being wrapped around the rollers and as such the belt pushes the liquid to the side within the area of a draining system.

Through an arrangement of drainage construction, the absorption capability of which is at least equal to the amount of liquid that emanates per unit time from the wetted belt drive, practically the same coefficient of friction is achieved between the drive and idler rollers and the belt as is obtained with a dry belt drive. The invention makes possible for the first time, the use of drive bands made of synthetic materials or rubber in addition to traditional steel bands. The advantage of synthetic materials and rubber is that drive and idler rollers may be used having much smaller diameters than those required for steel bands. Because of the reduction of the mass to be accelerated and/or decelerated in simulated service tests as well as because of the considerably smaller diameters, such test stands can now also be used for high speed investigations on vehicles as for instance described in DE-OS 30 40 355. Investigations on individual wheels with vertical displacements can now be carried out without having to accelerate unreasonably large masses.

The present invention includes means for the guidance and actuation of a flat belt drive loaded on its outer load carrying side, wetted on its inner driven side and trained around drive and idler rollers. Through the inventive provision of longitudinal profiles or grooves, essentially located in the direction of rotation, on the circumferences of the rollers and/or sheaves, which may consist of solid material or may be built hollow as drums, rotating drainage channels are created into which the liquid film can escape.

In accordance with the present invention, the volume between the belt and a drainage channel is at least equal to the average liquid volume to be drained. Such simple means provides the possibility of pushing the liquid film away into the drainage channels while the drive band is moving around the drive and idler rollers.

Through suitable design of grooves on the surface of the rollers and the roller surface portions therebetween contour fashioned so that the resulting edge pressure is smaller than the shear stress of the material chosen for the band drive, the service of life of bands made from steel, non-ferrous metals, rubber or synthetic materials, is not adversely affected. Especially favorable contours for the roller surface portions formed between the drainage grooves have resulted from crowned shapes with rounded edges toward the sides of the grooves.

An arrangement of passageways in the roller interconnecting the drainage channels or grooves functions to transport liquid to the outside in those cases where a large stream of liquid occurs that cannot be accommodated by the drainage channels alone.

A still further modification of the invention involves coordination of the load carrying portion of the roller surface portions that engage the flat belt to the distribution of the band tension over the width of the rollers. Better preservation of the band material results. It is also possible to distribute the drainage channels asymmetrically over the width of the drive and idler rollers.

To avoid the possibility of the occurrence of wear marks or nip points on the drive side of the flat band drive, it is suggested to arrange the drainage channels sinusoidally in the direction of rotation of the rollers.

To avoid fatigue fractures which could result from certain drainage channels and could lead to breakdown of such band drives in test machines, it is suggested that the bottom of the channels be fashioned in a rounded manner. A still further modification of the invention includes the arrangement of radial holes in the channel bottom of the drive and idler rollers if they are hollow, and stationary wiper devices with liquid diverters connected to them. If an increased liquid volume occurs, the excessive liquid volume can escape to the inside and be guided away. The above is particularly applicable in cases where suction is used for the liquid diversion.

Through the application of smooth drive and idler rollers having radially directed holes on the surface thereof and through stationary liquid wipers arranged at the inside of the rollers that cover the roller width and through connected liquid diverters, the liquid layer that is present on the inner drive side of the band is pushed away into these holes as the inner drive side of the band runs onto the surface of the drive and idler rollers. A favorable coefficient of friction is maintained between the dry and the wetted drive band and the drive and idler rollers. Beyond this, with such a drive system according to the invention it is not necessary to carry out additional measures with respect to changes in the liquid layer and with respect to shear strength.

The volume of drainage holes over the width of the roller may be the same or larger than the arriving volume of liquid. Liquid is transported through these holes into the inner portion of the roller. In a still further modification of the invention, the holes of a subsequent row in the direction of rotation are not located on the same circumferential circle but offset thereto between two holes of the preceding row. This prevents the formation of a liquid wedge between the holes even at high circumferential velocities which might otherwise lead to reduction of the coefficient of friction between the band and the roller surfaces.

If the holes are countersunk from the outside of the surface area of the roller and the edges of these countersunk holes form web-like protrusions, then a network of small webs is created that eliminate any eventually remaining liquid layer as a result of the pretension of the band drive. There is no need to consider the shear strength of the material since the lateral surfaces of the rollers support the drive side of the band, whereby the openings of the network consist of recesses, namely the countersunk holes, through which the liquid is guided to the inside of the hollow roller.

Cylindrically countersunk holes represent a special variation of such countersunk holes. Instead of cylindrical countersinking, the largest area of the countersink can also be quadratic, rombic or hexagonal, so that a corresponding network of small but equally sized load carrying webs is formed on the surface area of the drive and idler rollers. The present invention may be applied to all rollers such as the, sheaves or drums of band drives independent of the lateral surface thereof, whether smooth or crowned.

In cases where rubber or synthetic materials are used for such band drives, the layer of synthetic material normally applied to the plate of the support arrangement between the drive and idler rollers and needed for emergency operation, can be omitted. The lateral guides by rolls or support plates may also be omitted.

BRIEF DESCRIPTION OF THE DRAWING

Novel features and advantages of the present invention in addition to those mentioned above will become apparent to those of ordinary skill in the art from a reading of the following detailed description in connection with the accompanying drawing wherein similar reference characters refer to similar parts and in which.

DETAILED DESCRIPTION OF THE INVENTION

Figure 1:
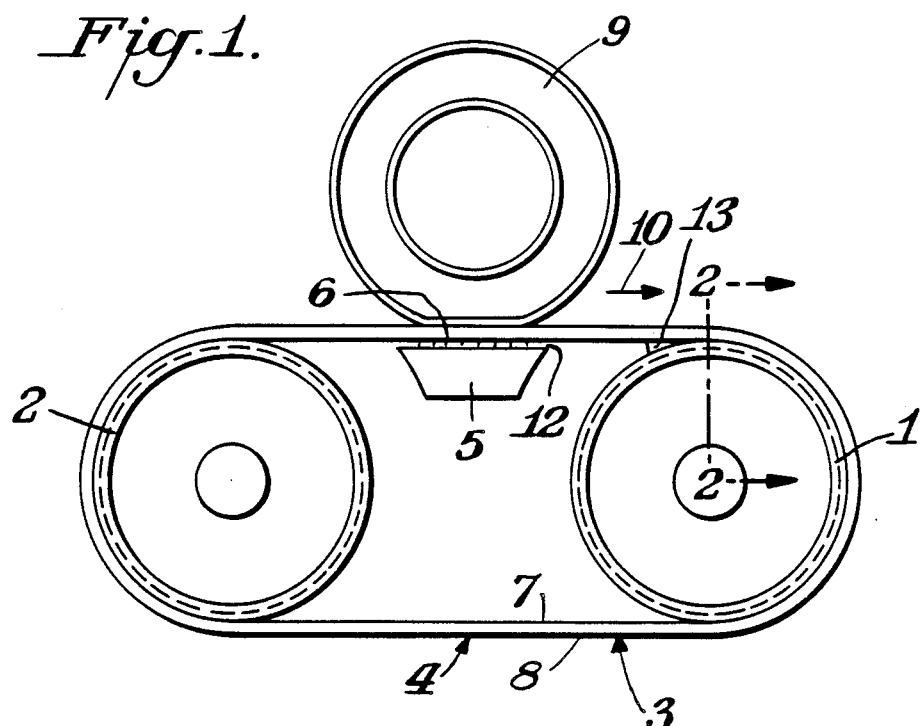
FIG. 1 is a side elevational view of a belt drive illustrating circumferential drainage channels or grooves in the drive and idler rollers, according to the present invention.

Referring in more particularity to the drawing, FIG. 1 shows a band drive 3 comprising a drive roller 1 and an idler roller 2 with a flat belt 4 trained around the rollers 1 and 2. The band drive 3 also includes a support arrangement 5 positioned between the idler roller and the drive roller for supporting the flat belt 4 particularly when a load is placed on the outer load bearing surface 8 of the belt. A liquid flow 6 emanates from the support arrangement 5, and the liquid flows between the underside of the belt 4 and the support arrangement 5 to provide a fluid support against the load of a vehicle wheel 9 acting against the outer load carrying surface 8 of the belt.

The belt 4 is driven so that it moves in the direction of arrow 10, which may either be accomplished by the drive roller 1 but also by the vehicle wheel, and may be in an accelerating as well as in a decelerating mode. Forces act upon the load carrying side 8 of the belt 4, and at least part of the liquid stream 6 emanates from a gap 12 between belt 4 and support 5 in the direction of arrow 10 to wet the inner drive side 7 of the belt 4 up to the point where the belt contacts the drive or idler roller. The drive and idler rollers may be hollow or solid or sheave-like in construction.

Depending on the velocity of the belt 4, the liquid stream 6 tends to be drawn in the form of a liquid wedge 13 between the surface area of the idler or drive roller and the drive belt 4. This liquid wedge tends to reduce the coefficient of friction between the driven side 7 of the flat belt 4 and the surface area of the idler or drive rollers. At correspondingly high velocities the coefficient of friction diminishes so much that little if any drive forces for acceleration or deceleration are transmitted between the rollers and the drive surface 7. Under these circumstances the lateral forces that are introduced into the load carrying side 8 of the drive band 4 are not reacted by roller 1 via the drive side 7 of the belt 4.

Through an arrangement of drainage channels or grooves 23 formed in the outer surface of the idler and drive rollers, the action of a liquid wedge 13 is suppressed even at high speed.

Figure 2:
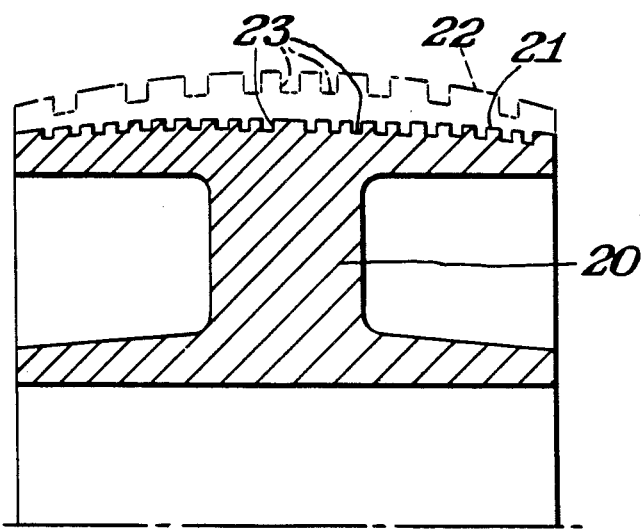
FIG. 2 is a sectional view taken along line 2—2 of FIG. 1 and also illustrating an alternative crowned roller surface which is shown in phantom outline.

FIG. 2 shows the cross-section of a drive or idler roller 20 the outside surface of which may be of generally cylindrical form 21 or of crowned form 22 upon which drainage channels or grooves 23 are arranged running in the direction of rotation of the roller.

Figure 3:
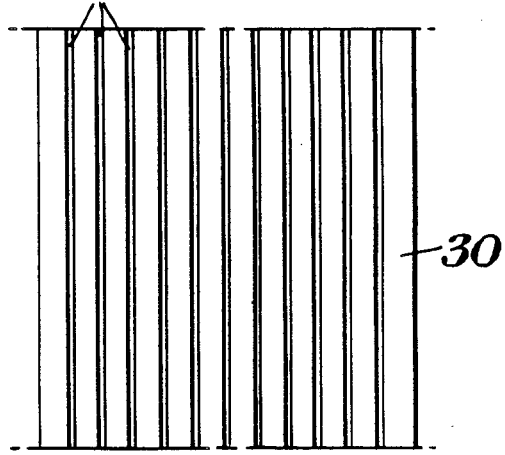
FIG. 3 is a partial top plan view of one of the rollers of FIG. 1 with the circumferential drainage channels or grooves therein.
Figure 4:
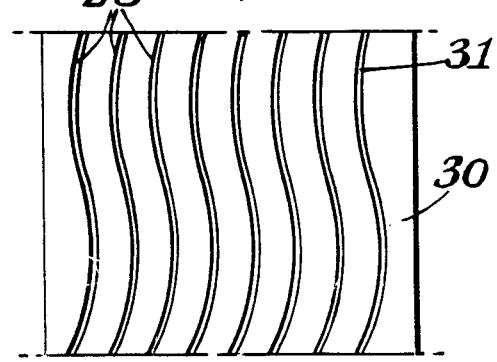
FIG. 4 is a partial top plan view similar to FIG. 3 but illustrating a variation of the drainage channels or grooves.

FIG. 3 shows part of the surface 30 of the drive or idler roller where the drainage channels or grooves run parallel to one another in a circumferential direction on the outer surface of the roller. FIG. 4 shows an alternative arrangement where the surface 30 has an approximately sinusoidal course 31 of drainage channels or grooves 23 on the circumference of the drive or idler roller.

Figure 5:
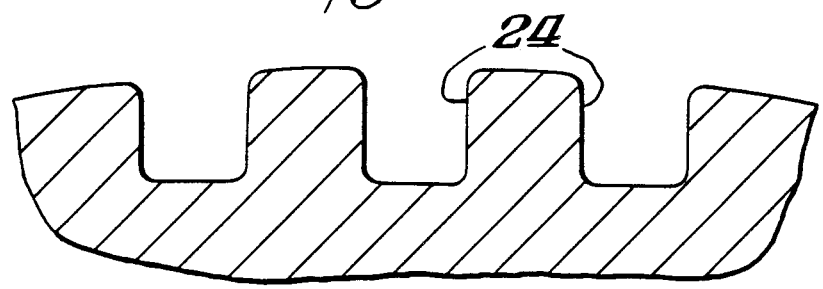
FIG. 5 is a partial sectional view similar to FIG. 2 but illustrating alternate drainage channels or grooves.
Figure 6:
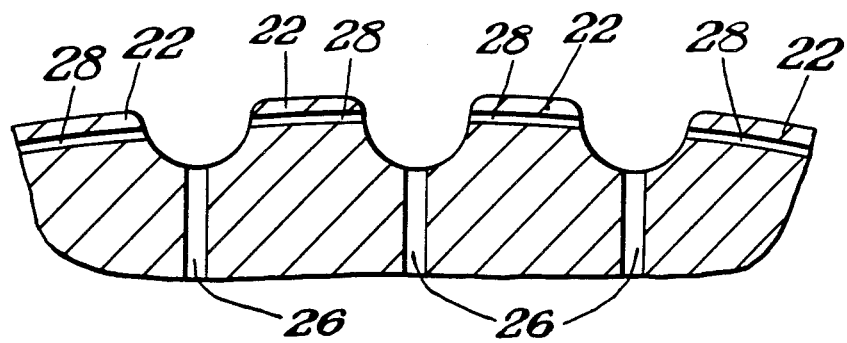
FIG. 6 is a partial sectional view similar to FIG. 5 but illustrating still another embodiment.

FIG. 5 shows a plurality of drainage channels or grooves 24 each having a generally rectangular cross-section. In FIG. 6 the drainage grooves each have a rounded groove bottom 25. FIG. 6 also shows webs 22 between the grooves having the rounded groove bottoms 25. The grooves are interconnected by passageways 28 which extend in an axial direction directly below the roller surface. Radially extending passageways run inwardly for carrying away excess liquid from the area of the drainage channels or grooves when an excess volume of liquid must be removed.

Figure 7:
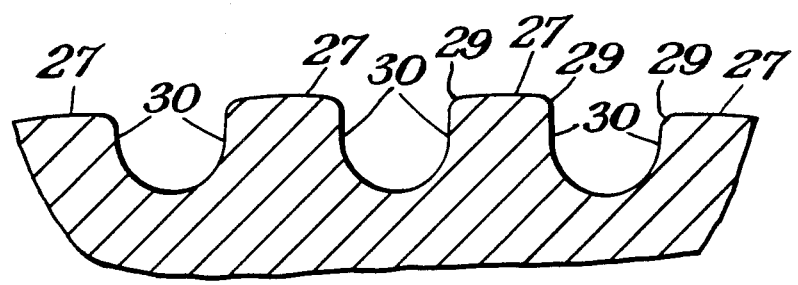
FIG. 7 is a partial sectional view similar to FIG. 5 but illustrating another embodiment.

FIG. 7 shows crowned web surfaces 27 and rounded transitions 29 between those surfaces and the sides 30 of the drainage channels. A displacement of the liquid volume coming from the drive side 7 of the belt 4 is achieved, and, simultaneously, the rounded transition 29 reduces the shear forces that act upon the belt as a result of the pretension of the belt and the wheel load thereon.

Figure 8:
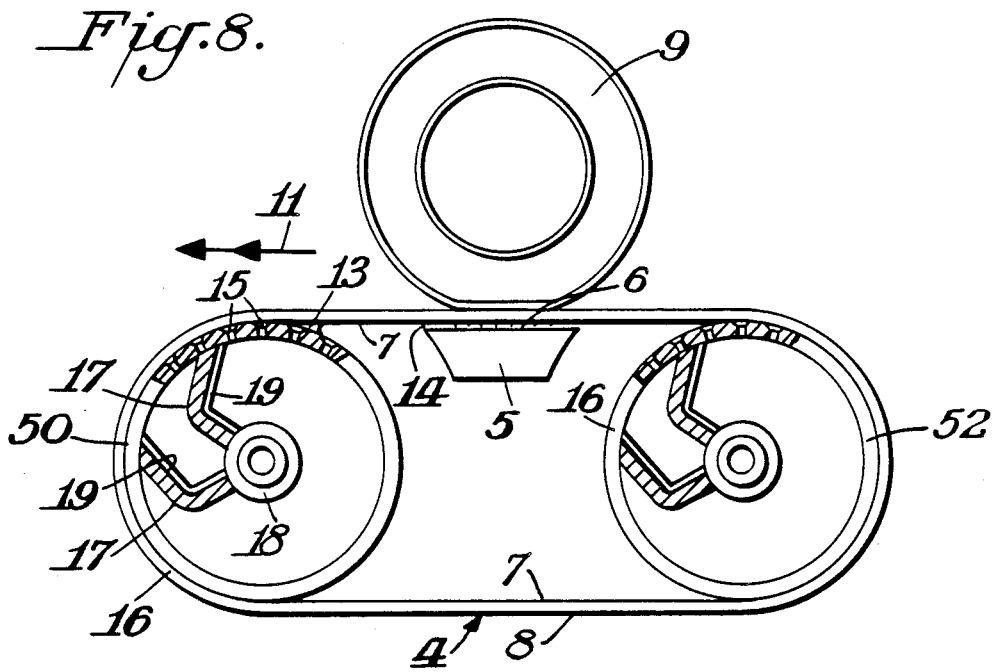
FIG. 8 is a side elevational view of another belt drive illustrating countersunk drainage openings in the drive and idler rollers, according to the present invention.

FIG. 8 shows an alternate embodiment including a drive roller 50 and idler roller 52 about which flat belt 4 is trained. Movement of the belt is in the direction of double arrow 11 and at least part of the liquid stream 6 emanates from the gap 14 tending to form a liquid wedge 13 in the area of the entry of drive band 4 upon the outer surface of the drive or idler roller. However, these rollers include a plurality of drainage openings 15 arranged in the roller surface 16 to drain liquid away from the roller surface and thereby prevent the formation of any such liquid wedge. Also, by means of a wiper arrangement 17 and a stationary diverting device 18, draining liquid is removed from inside the drive and idler rollers. The liquid diversion can, in addition, be enhanced by suction connected to the channels 19. The amount of liquid pulled away by suction may be carried away via the bearing of the smooth drum when the journals of rollers are formed as hollow shafts.

Figure 9:
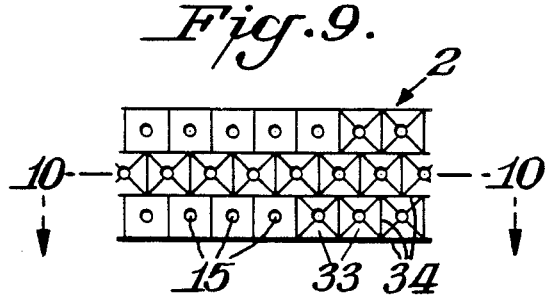
FIG. 9 is a partial top plan view of the countersunk drainage openings shown in FIG. 8.
Figure 10:
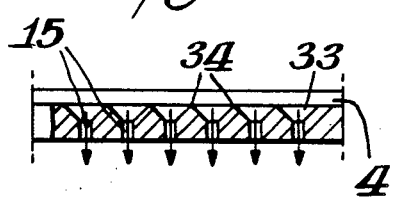
FIG. 10 is a sectional view taken along line 10—10 of FIG. 9.

FIGS. 9 through 13 illustrate different drainage openings for the drive and idler rollers 50, 52. FIGS. 9 and 10 show the radial drainage holes 15 of the embodiment of FIG. 8. These openings are surrounded by square-shaped countersunk depressions 33. The depressions 33 form a square pattern of webs 34 which covers the surface of the smooth perforated rollers 50, 52. FIG. 9 shows that the rows of radial holes 15 can also be arranged either in a consistent sequence or in a staggered sequence.

Figure 11:
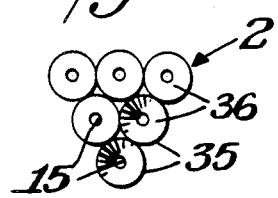
FIG. 11 is a view similar to FIG. 9 but illustrating different countersunk drainage openings.

FIG. 11 shows a round web pattern 35, and in this case the radial drainage openings or holes 15 are surrounded by circular countersunk depressions 36.

Figure 12:
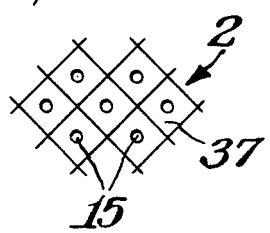
FIG. 12 is a view similar to FIG. 9 but illustrating still another variation of the drainage openings.
Figure 13:
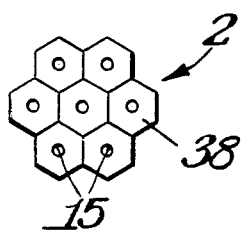
FIG. 13 is a view similar to FIG. 9 illustrating still another variation of the drainage openings.

FIG. 12 represents a rombic web pattern 37 which covers the surface of the smooth perforated rollers 50, 52 while in FIG. 13 a hexagonal web pattern 38 covers the smooth rollers.

FIG. 10 clearly shows that the flat belt 4 clings to the smooth perforated roller. In this manner, the liquid volume that adheres to the underside of the belt is forced into the interior of the smooth perforated roller via the square-shaped countersunk portions 33 that are separated in each case by the web pattern 34 and through the radial holes 15. Wiper devices 17 and diverter devices 18 function to remove liquid from inside the roller.

Through prudent selection of the web pattern a specific web form can be selected for the particular material used for the flat drive belt 4. Proper selection will insure the transmittal of forces between the drive roller 50 and the drive belt 4 for longitudinal as well as for lateral forces, even when the inner surface of the flat belt 4 is covered with a liquid film.

What is claimed is:

1. Apparatus for guiding and moving a belt comprising a drive roller, an idler roller, and a flat belt trained around the rollers, the flat belt having an outer load bearing surface and an inner surface wetted with liquid to assist in supporting a load and to reduce friction, and each of the rollers having a smooth exterior surface and a hollow interior, drainage openings in the roller extending from the exterior surface thereof to the hollow interior, and stationary wiper elements within the hollow roller interior for collecting and removing liquid that drains through the drainage openings.

2. Apparatus as in claim 1 including diverting means connected to the wipers for removing the liquid, and suction means connected to the diverting means.

3. Apparatus as in claim 1 wherein the drainage openings are positioned in parallel rows each row extending across the width of the rollers.

4. Apparatus as in claim 1 wherein each of the drainage openings in the rollers includes a countersunk portion next to the belt engaging exterior surface of the rollers.

5. Apparatus as in claim 4 wherein each countersunk portion is cylindrical.

6. Apparatus as in claim 4 wherein each countersunk portion is conical.

7. Apparatus as in claim 4 wherein each countersunk portion is pyrimidal.

* * * * *